(12) United States Patent
Lee et al.

(10) Patent No.: US 11,166,255 B2
(45) Date of Patent: Nov. 2, 2021

(54) MONITORING A PAGING ON AN UNLICENSED BAND

(71) Applicant: LG ELECTRONICS INC., Seoul (KR)

(72) Inventors: Yejee Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/701,930

(22) Filed: Dec. 3, 2019

(65) Prior Publication Data

US 2020/0178203 A1 Jun. 4, 2020

(51) Int. Cl.
| | | |
|---|---|---|
| *H04W 68/00* | (2009.01) | |
| *H04W 16/14* | (2009.01) | |
| *H04W 24/08* | (2009.01) | |
| *H04W 76/11* | (2018.01) | |

(52) U.S. Cl.
CPC ......... *H04W 68/005* (2013.01); *H04W 16/14* (2013.01); *H04W 24/08* (2013.01); *H04W 76/11* (2018.02)

(58) Field of Classification Search
CPC ... H04W 68/005; H04W 76/11; H04W 16/14; H04W 24/08
USPC ........................................................ 370/329
See application file for complete search history.

(56) References Cited

U.S. PATENT DOCUMENTS

| | | | |
|---|---|---|---|
| 2019/0090191 A1* | 3/2019 | Liu | H04W 4/08 |
| 2019/0223150 A1* | 7/2019 | Islam | H04L 5/0048 |
| 2019/0281580 A1* | 9/2019 | Rune | H04W 68/02 |
| 2020/0154393 A1* | 5/2020 | Hoglund | H04W 68/005 |
| 2020/0169955 A1* | 5/2020 | Chang | H04W 4/70 |
| 2020/0196234 A1* | 6/2020 | Turtinen | H04W 52/0274 |
| 2020/0229147 A1* | 7/2020 | Jiang | H04W 72/0446 |
| 2020/0329454 A1* | 10/2020 | Tang | H04W 16/14 |
| 2020/0344718 A1* | 10/2020 | Ozturk | H04W 24/08 |
| 2020/0404617 A1* | 12/2020 | Murray | H04W 68/02 |
| 2021/0045098 A1* | 2/2021 | Bi | H04W 68/02 |

FOREIGN PATENT DOCUMENTS

WO   WO 2019/127483 A1 * 12/2017 ............ H04W 72/04

* cited by examiner

*Primary Examiner* — Mong-Thuy T Tran
(74) *Attorney, Agent, or Firm* — Dentons US LLP

(57) ABSTRACT

Provided are a method for monitoring paging. According to an embodiment of the present disclosure, the method includes calculating a first paging occasion (PO) based on identifier (ID) of the wireless device which belongs to a first group, monitoring the first PO based on a first frequency, receiving frequency pattern information on the first frequency, when a signal is not detected in the first PO, monitoring a second PO on a second frequency based on the frequency pattern information.

9 Claims, 13 Drawing Sheets

MONITORING A PAGING ON AN UNLICENSED BAND

CROSS-REFERENCE TO RELATED APPLICATIONS

Pursuant to 35 U.S.C. § 119 (e), this application claims the benefit of Korean Patent Application No. 10-2018-0154734, filed on Dec. 4, 2018, the contents of which are all hereby incorporated by reference herein in their entirety.

TECHNICAL FIELD

The present disclosure relates to paging.

BACKGROUND ART

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

DISCLOSURE

Technical Problem

In LTE LAA, unlicensed band is not considered as PCell. However, NR standalone operation on unlicensed band has been studied. So, paging reception should be newly considered for NR standalone. For example, paging transmission could be dropped due to LBT failure. Such dropped paging transmission will cause delayed MT access because gNB and UE should wait until the next paging occasion occurs for the UE. Accordingly, we need to study how to recover from missing paging transmissions dropped due to LBT failure in terms of the paging delay and extra UE power consumption.

Technical Solution

According to an embodiment of the present disclosure, a method performed by a wireless device in a wireless communication system is provided. The method may comprise calculating a first paging occasion (PO) based on identifier (ID) of the wireless device which belongs to a first group, monitoring the first PO based on a first frequency, receiving frequency pattern information on the first frequency, when a signal is not detected in the first PO, monitoring a second PO on a second frequency based on the frequency pattern information.

Advantageous Effects

The present disclosure can have various advantageous effects.

For example, the network may dynamically control the UE distribution on the frequency. If UEs are crowded on a frequency, the success probability of uplink LBT would be low. The PO is calculated by UE ID. So, some PO may be crowded and some PO may be not. Further, the network may dynamically control the UE distribution and it can increase the success probability of uplink LBT.

For example, the UE may not need to wait until the next DRX cycle. From the present disclosure, the UE monitors additional PO on the additional frequency. So, it can reduce the paging delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

MODE FOR DISCLOSURE

Figure 1:
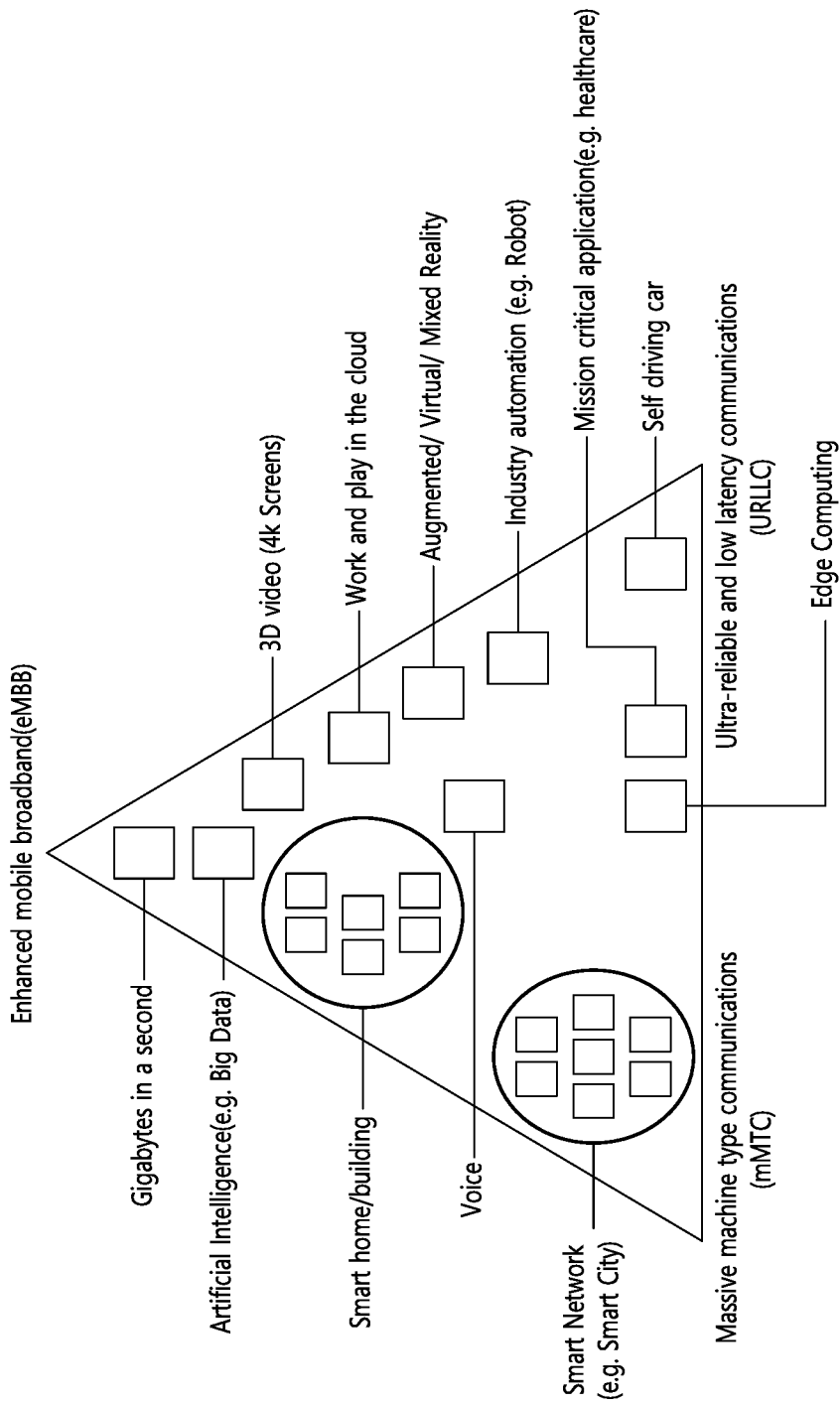
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
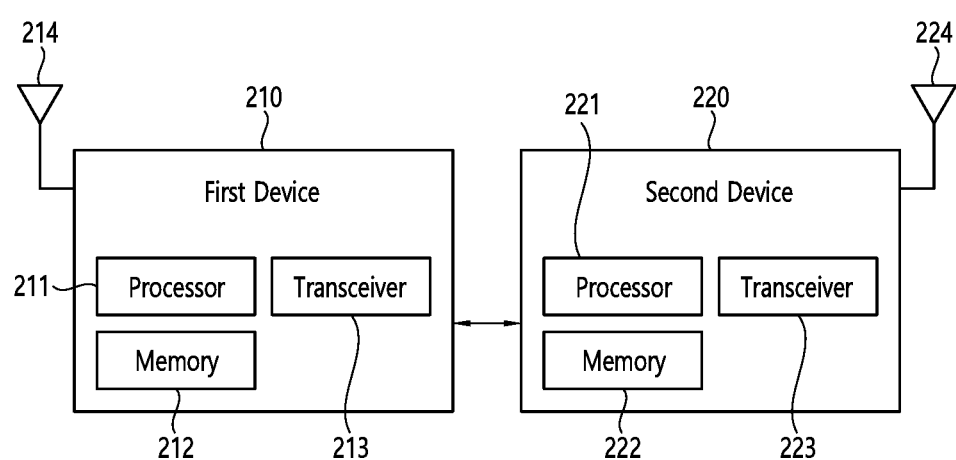
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
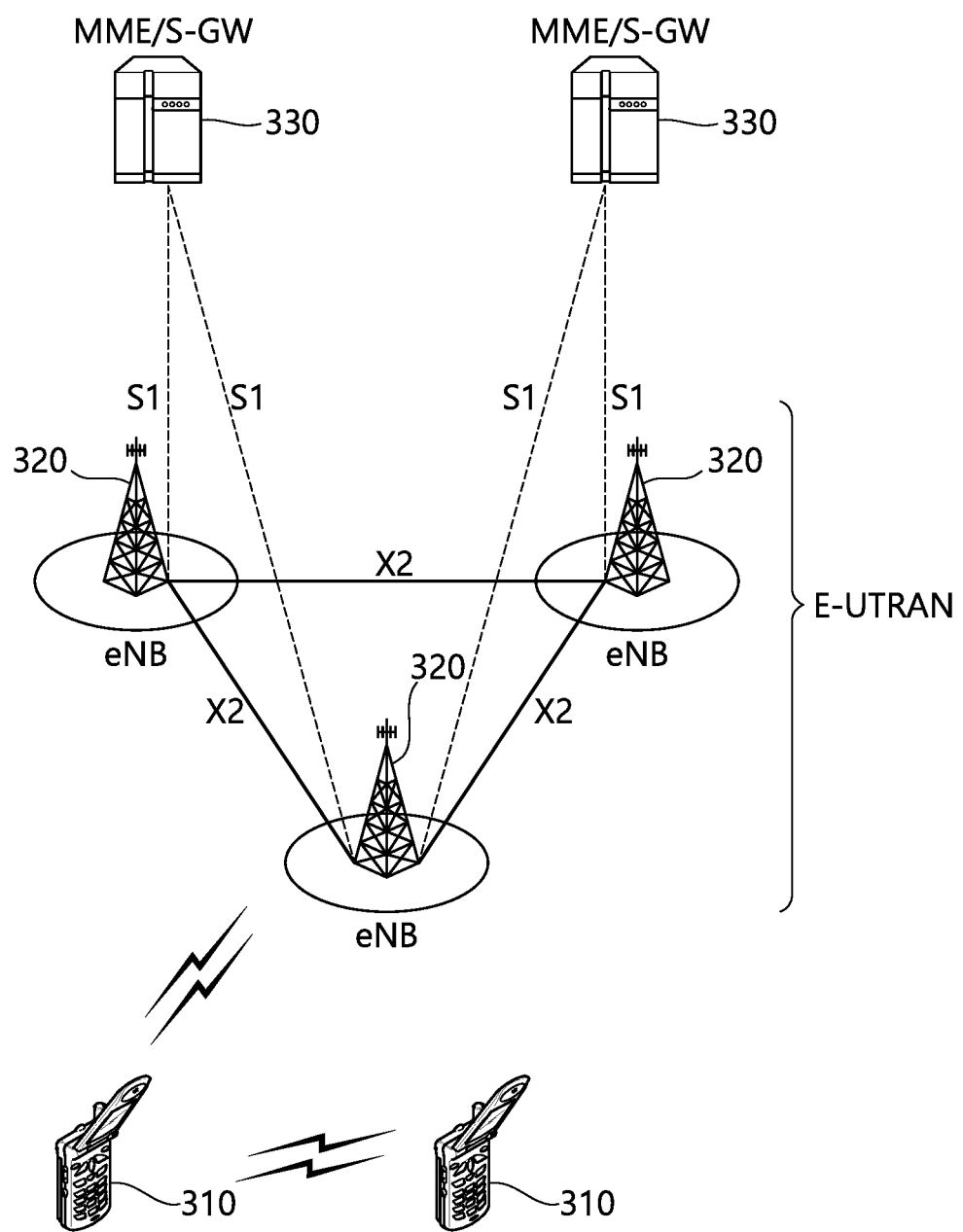
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMES/S-GWs and eNBs.

Figure 4:
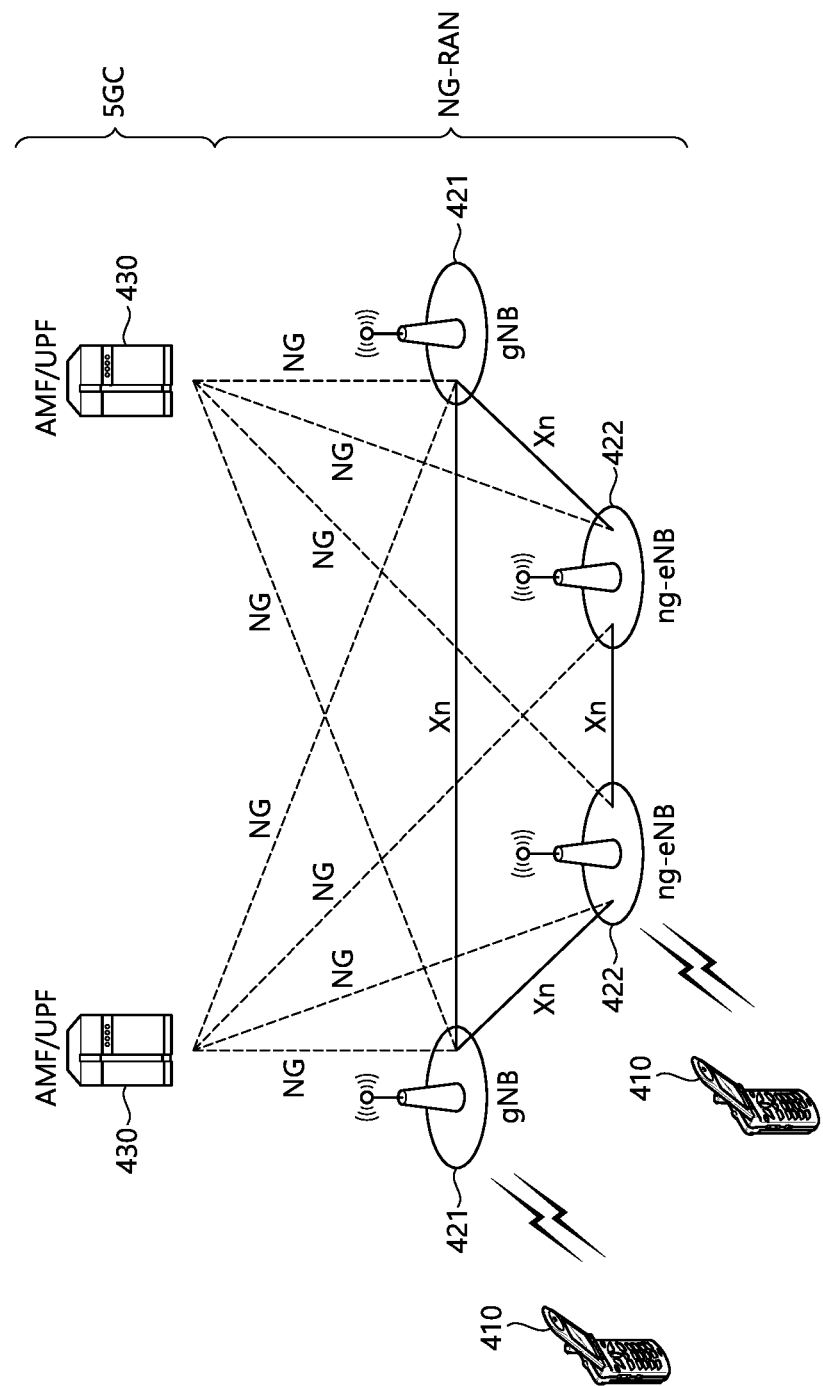
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF) and user plane function (UPF) 430, and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
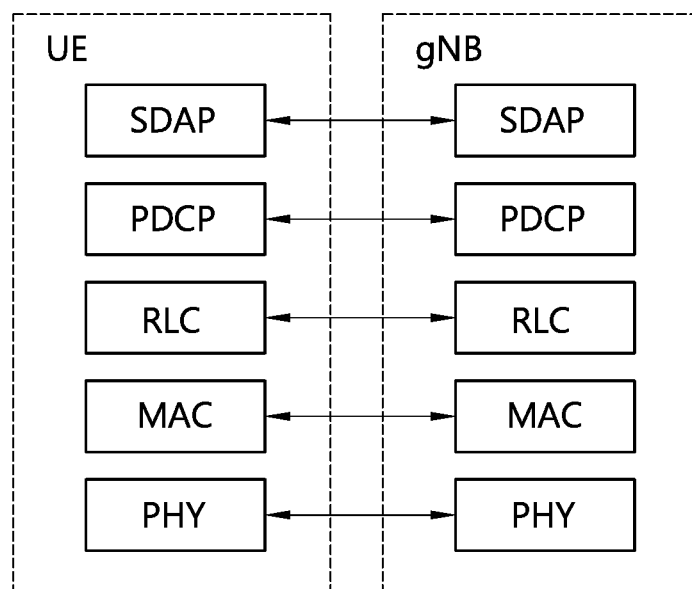
FIG. 5 shows a block diagram of a user plane protocol stack to which the technical features of the present disclosure can be applied.
Figure 6:
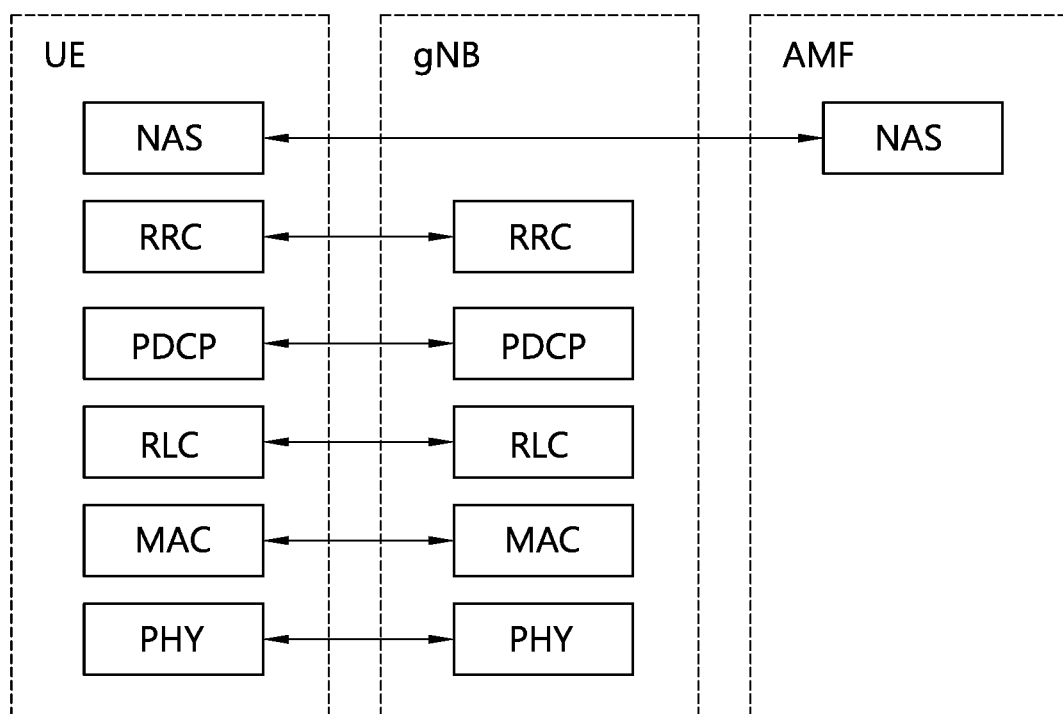
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (III) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

DL Assignment reception for DL-SCH data transfer is described.

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or Temporary C-RNTI, the MAC entity shall for each TTI during which it monitors PDCCH and for each Serving Cell:
  if a downlink assignment for this TTI and this Serving Cell has been
  received on the PDCCH for the MAC entity's C-RNTI, or Temporary C-RNTI:
  if this is the first downlink assignment for this Temporary C-RNTI:
  consider the NDI to have been toggled.
  if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
  consider the NDI to have been toggled regardless of the value of the NDI.
  indicate the presence of a downlink assignment and deliver the associated HARQ information to the HARQ entity for this TTI.
  else, if this Serving Cell is the SpCell and a downlink assignment for this TTI has been received for the SpCell on the PDCCH of the SpCell for the MAC entity's Semi-Persistent Scheduling C-RNTI:
  if the NDI in the received HARQ information is 1:
  consider the NDI not to have been toggled;
  indicate the presence of a downlink assignment and deliver the associated HARQ information to the HARQ entity for this TTI.
  else, if the NDI in the received HARQ information is 0:
  if PDCCH contents indicate SPS release:
  clear the configured downlink assignment (if any);
  if the timeAlignmentTimer associated with the pTAG is running:
  indicate a positive acknowledgement for the downlink SPS release to the physical layer.
  else:
  store the downlink assignment and the associated HARQ information as configured downlink assignment;
  initialise (if not active) or re-initialise (if already active) the configured downlink assignment to start in this TTI and to recur;
  set the HARQ Process ID to the HARQ Process ID associated with this consider the NDI bit to have been toggled;
  indicate the presence of a configured downlink assignment and deliver the stored HARQ information to the HARQ entity for this TTI.

UL Grant reception for UL-SCH data transfer is described.

In order to transmit on the UL-SCH the MAC entity must have a valid uplink grant (except for non-adaptive HARQ retransmissions) which it may receive dynamically on the PDCCH or in a Random Access Response or which may be configured semi-persistently or preallocated by RRC. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, a UL Semi-Persistent Scheduling V-RNTI, or a Temporary C-RNTI, the MAC entity shall for each TTI and for each Serving Cell belonging to a TAG that has a running timeAlignmentTimer and for each grant received for this TTI and for each SPS configuration that is indicated by the PDCCH addressed to UL Semi-Persistent Scheduling V-RNTI:
  if an uplink grant for this TTI and this Serving Cell has been received on the PDCCH for the MAC entity's C-RNTI or Temporary C-RNTI; or
  if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI, for the MAC entity's UL Semi-Persistent Scheduling V-RNTI, or a configured uplink grant:
  consider the NDI to have been toggled for the corresponding HARQ process regardless of the value of the NDI.
  deliver the uplink grant and the associated HARQ information to the HARQ entity for this TTI.
  else, if this Serving Cell is the SpCell and if an uplink grant for this TTI has been received for the SpCell on the PDCCH of the SpCell for the MAC entity's Semi-Persistent Scheduling C-RNTI or for the MAC entity's UL Semi-Persistent Scheduling V-RNTI:
  if the NDI in the received HARQ information is 1:
  consider the NDI for the corresponding HARQ process not to have been toggled;
  deliver the uplink grant and the associated HARQ information to the HARQ entity for this TTI.
  else if the NDI in the received HARQ information is 0:
  if PDCCH contents indicate SPS release:
  if the MAC entity is configured with skipUplinkTxSPS: trigger an SPS confirmation;
  if an uplink grant for this TTI has been configured:
  consider the NDI bit for the corresponding HARQ process to have been toggled;
  deliver the configured uplink grant and the associated HARQ information to the HARQ entity for this TTI;
  else:
  clear the corresponding configured uplink grant (if any). else:
  if the MAC entity is configured with skipUplinkTxSPS: trigger an SPS confirmation;
  store the uplink grant and the associated HARQ information as configured uplink grant;
  initialise (if not active) or re-initialise (if already active) the configured uplink grant to start in this TTI and to recur;
  if UL HARQ operation is asynchronous, set the HARQ Process ID to the HARQ Process ID associated with this TTI;
  consider the NDI bit for the corresponding HARQ process to have been toggled;
  deliver the configured uplink grant and the associated HARQ information to the HARQ entity for this TTI.

Semi-Persistent Scheduling is described.

When Semi-Persistent Scheduling is enabled by RRC, the following information is provided:
  Semi-Persistent Scheduling C-RNTI or UL Semi-Persistent Scheduling V-RNTI;
  Uplink Semi-Persistent Scheduling interval semiPersistSchedIntervalUL and number of empty transmissions before implicit release implicitReleaseAfter, if Semi-Persistent Scheduling with Semi-Persistent Scheduling C-RNTI is enabled for the uplink;
  Uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink;
  Whether twoIntervalsConfig is enabled or disabled for uplink, only for TDD;
  Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the SpCell only.

Semi-Persistent Scheduling is not supported for RN communication with the E-UTRAN in combination with an RN subframe configuration.

NOTE: When eIMTA is configured for the SpCell, if a configured uplink grant or a configured downlink assignment occurs on a subframe that can be reconfigured through eIMTA L1 signalling, then the UE behaviour is left unspecified.

In case of Downlink, after a Semi-Persistent downlink assignment is configured, the MAC entity shall consider sequentially that the Nth assignment occurs in the subframe for which:

$$(10*SFN+\text{subframe})=[(10*\text{SFNstart time}+\text{subframestart time})+N*\text{semiPersistSchedIntervalDL}] \text{ modulo } 10240.$$

Where SFNstart time and subframestart time are the SFN and subframe, respectively, at the time the configured downlink assignment were (re-)initialised.

For BL UEs or UEs in enhanced coverage SFNstart time and subframestart time refer to SFN and subframe of the first transmission of PDSCH where configured downlink assignment was (re-)initialized.

In case of Uplink, after a Semi-Persistent Scheduling uplink grant is configured, the MAC entity shall:
  if twoIntervalsConfig is enabled by upper layer:
  set the Subframe_Offset according to Table 7.4-1.
  else:
  set Subframe_Offset to 0.
  consider sequentially that the Nth grant occurs in the subframe for which:

$$(10*SFN+\text{subframe})=[(10*\text{SFNstart time}+\text{subframestart time})+N*\text{semiPersistSchedIntervalUL}+ \text{Subframe\_Offset}*(N \text{ modulo } 2)] \text{ modulo } 10240.$$

Where SFNstart time and subframestart time are the SFN and subframe, respectively, at the time the configured uplink grant were (re-)initialised.

For TDD, the MAC entity is configured with semiPersistSchedIntervalUL shorter than 10 subframes, the Nth grant shall be ignored if it occurs in a downlink subframe or a special subframe.

If the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

If SPS confirmation has been triggered and not cancelled:

if the MAC entity has UL resources allocated for new transmission for this III:

instruct the Multiplexing and Assembly procedure to generate an SPS confirmation MAC Control Element;

cancel the triggered SPS confirmation.

The MAC entity shall clear the configured uplink grant immediately after first transmission of SPS confirmation MAC Control Element triggered by the SPS release.

NOTE: Retransmissions for Semi-Persistent Scheduling can continue after clearing the configured uplink grant.

For BL UEs or UEs in enhanced coverage SFNstart time and subframestart time refer to SFN and subframe of the first transmission of PUSCH where configured uplink grant was (re-)initialized.

In the event of a resource conflict between multiple UL SPS configurations configured with Uplink Semi-Persistent Scheduling V-RNTI, the UE behaviour is undefined.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent. One Paging Frame (PF) is one Radio Frame and may contain one or multiple PO(s) or starting point of a PO.

In multi-beam operations, the length of one PO is one period of beam sweeping and the UE can assume that the same paging message is repeated in all beams of the sweeping pattern and thus the selection of the beam(s) for the reception of the paging message is up to UE implementation. The paging message is same for both RAN initiated paging and CN initiated paging.

The UE initiates RRC Connection Resume procedure upon receiving RAN paging. If the UE receives a CN initiated paging in RRC_INACTIVE state, the UE moves to RRC_IDLE and informs NAS.

PF, PO are determined by the following formulae:

SFN for the PF is determined by:

$$(SFN + PF\_\text{offset}) \bmod T = (T \operatorname{div} N) * (UE\_ID \bmod N)$$

Index (i_s), indicating the start of a set of PDCCH monitoring occasions for the paging DCI, is determined by:

i_s = floor (UE_ID/N) mod Ns

The PDCCH monitoring occasions for paging are determined according to paging-SearchSpace and firstPDCCH-MonitoringOccasionOfPO if configured. Otherwise, the PDCCH monitoring occasions for paging are determined according to the default association (i.e. PDCCH monitoring occasions for paging are same as for RMSI).

For default association, Ns is either 1 or 2. For Ns=1, there is only one PO which starts in the PF. For Ns=2, PO is either in the first half frame (i_s=0) or the second half frame (i_s=1) of the PF.

For non-default association (i.e. when paging-SearchSpace is used), the UE monitors the (i_s+1)th PO where the first PO starts in the PF. The PDCCH monitoring occasions for paging which are not overlapping with UL symbols are sequentially numbered from zero starting from the 1st PDCCH monitoring occasion for paging in the PF. When firstPDCCH-MonitoringOccasionOfPO is present, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to ssb-PositionsInBurst in SystemInformationBlock1. The Kth PDCCH monitoring occasion for paging in the PO corresponds to the Kth transmitted SSB.

Parameters N, Ns, first-PDCCH-MonitoringOccasionOfPO, PF_offset, and the length of default DRX Cycle are signaled in SIB1.

If the UE has no 5G-S-TMSI, for instance when the UE has not yet registered onto the network, the UE shall use as default identity UE_ID=0 in the PF and i_s formulas above.

5G-S-TMSI is a 48 bit long bit string. 5G-S-TMSI shall in the formulae above be interpreted as a binary number where the left most bit represents the most significant bit.

Licensed-Assisted Access (LAA) is described.

Carrier aggregation with at least one SCell operating in the unlicensed spectrum is referred to asLAA. In LAA, the configured set of serving cells for a UE therefore always includes at least one SCell operating in the unlicensed spectrum according to Frame structure Type 3, also called LAA SCell. Unless otherwise specified, LAA SCells act as regular SCells.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

The combined time of transmissions compliant with the channel access procedure by an eNB should not exceed 50 ms in any contiguous 1 second period on an LAA SCell.

Which LBT type (i.e. type 1 or type 2 uplink channel access) the UE applies is signalled via uplink grant for uplink PUSCH transmission on LAA SCells.

For uplink LAA operation, the eNB shall not schedule the UE more subframes than the minimum necessary to transmit all the traffic corresponding to the selected Channel Access Priority Class or lower, than the:

Channel Access Priority Class signaled in UL grant based on the latest BSR and received uplink traffic from the UE if type 1 uplink channel access procedure is signaled to the UE;

Channel Access Priority Class used by the eNB based on the downlink traffic, the latest BSR and received UL traffic from the UE if type 2 uplink channel access procedure is signaled to the UE.

Recently, NR standalone operation on unlicensed band has been studied. In LTE LAA, unlicensed band is not considered as PCell. So, paging reception should be newly considered for NR standalone. For example, paging transmission could be dropped due to LBT failure. Such dropped paging transmission will cause delayed MT access because gNB and UE should wait until the next paging occasion occurs for the UE. Accordingly, we need to study how to recover from missing paging transmissions dropped due to LBT failure in terms of the paging delay and extra UE power consumption. Therefore, a method may be needed for a UE to monitor a paging additionally.

Figure 7:
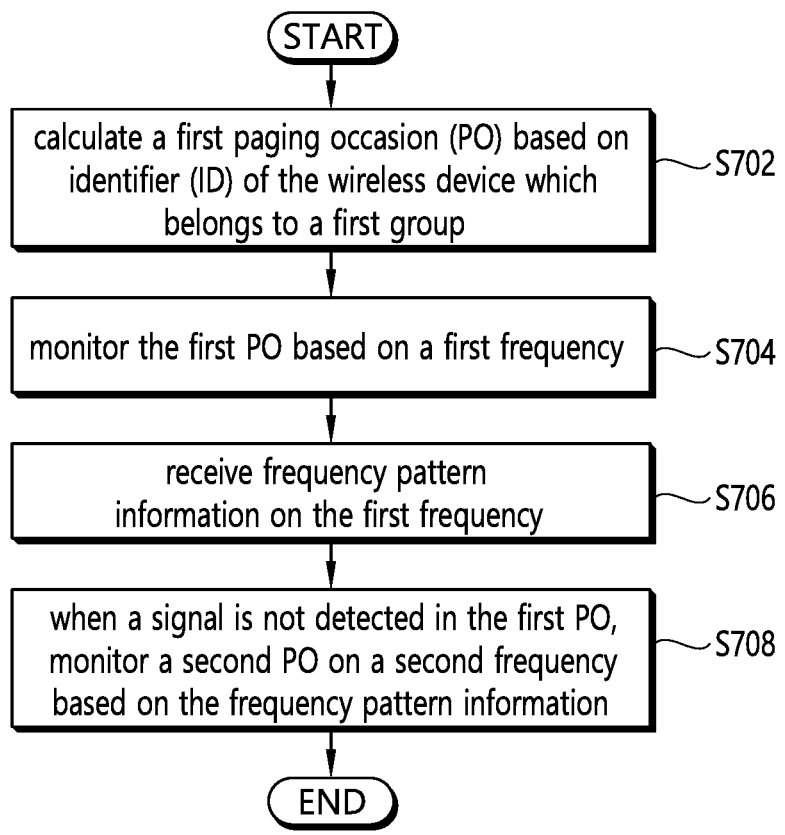
FIG. 7 shows a method for monitoring a paging in unlicensed band according to an embodiment of the present disclosure.

FIG. 7 shows a method for monitoring a paging in unlicensed band according to an embodiment of the present disclosure.

In step S702, a wireless device may calculate a first paging occasion (PO) based on identifier (ID) of the wireless device which belongs to a first group.

In step S704, the wireless device may monitor the first PO based on a first frequency.

In step S706, the wireless device may receive frequency pattern information on the first frequency. The frequency pattern information may include information on the second group of wireless devices. The frequency pattern information may be transmitted via a dedicated message or a broadcast message In step S708, when a signal is not detected in the first PO, the wireless device may monitor a second PO on a second frequency based on the frequency pattern information. The second PO may be related to a second group. The first PO and the second PO may be located in different time duration. A gap between the first PO and the second PO may be smaller than a periodicity of the first PO. The first frequency and the second frequency may be on an unlicensed band. It may be determined that the signal is not detected in the first PO, when a channel quality related to the first PO is below a threshold.

The wireless device communicates with at least one of a mobile terminal, a network or autonomous vehicles other than the wireless device.

According to embodiments of the present disclosure, the network may dynamically control the UE distribution on the frequency. If UEs are crowded on a frequency, the success probability of uplink LBT would be low. The PO is calculated by UE ID. So, some PO may be crowded and some PO may be not. Further, the network may dynamically control the UE distribution and it can increase the success probability of uplink LBT. Also, the UE may not need to wait until the next DRX cycle. From the present disclosure, the UE monitors additional PO on the additional frequency. So, it can reduce the paging delay.

Figure 8:
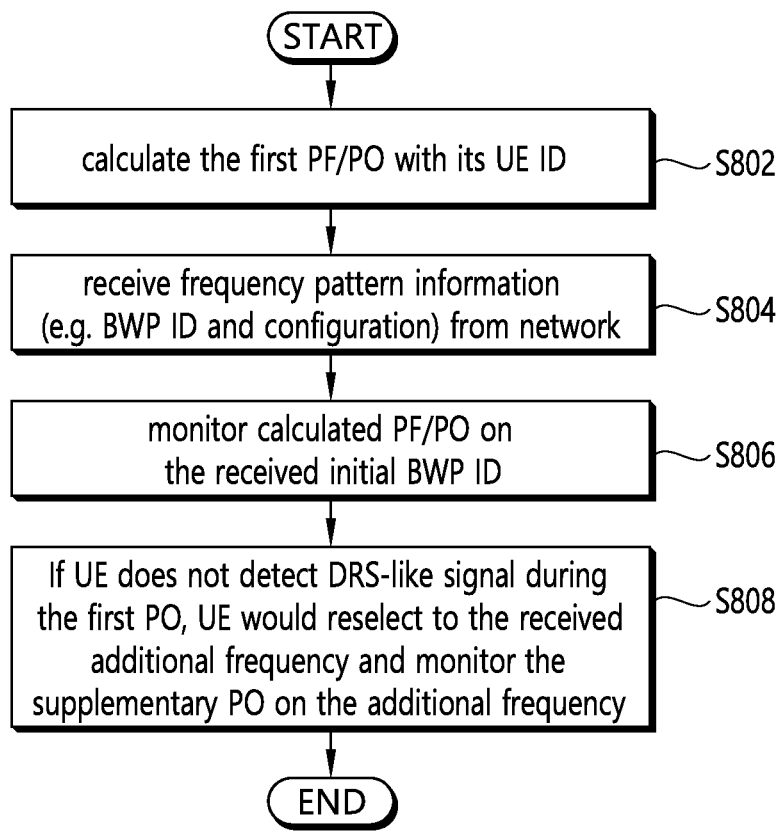
FIG. 8 shows a method for monitoring a paging in unlicensed band according to an embodiment of the present disclosure.

FIG. 8 shows a method for monitoring a paging in unlicensed band according to an embodiment of the present disclosure. In this embodiment, a UE may be not only a terminal device, but also any types of device operating as wireless device, for example, an integrated access backhaul (IAB) node. Therefore, a UE may be referred as a wireless device. This embodiment may be described in perspective of a UE.

In step S802, the UE may calculate an initial paging frame (PF) with its UE ID. The UE may calculate the initial paging occasion (PO) with its UE ID. The initial PF or initial PO may be configured based on the UE ID. That is, the initial PF or initial PO may correspond to the UE ID. The initial PO and PF may be the first PO and PF.

In step S804, the UE may receive frequency pattern information from network. The frequency pattern information may inform frequency pattern for the paging. The frequency pattern information may include at least one of a bandwidth part (BWP) ID and configuration.

The frequency pattern may correspond to the group of PO. The frequency pattern may correspond to UE ID. In other words, the frequency pattern may depend on the group of PO or UE ID.

The frequency pattern information may include at least one of initial BWP ID, configuration and the frequency pattern of additional PO. Further, the frequency pattern information may include BWP ID offset, additional BWP ID, and configuration.

The UE may receive the frequency pattern information via broadcast message, or dedicated message. The broadcast message may be at least one of SIB or default PO. The dedicated message may be release message. For example, the frequency pattern information may be transmitted on the initial PO. The frequency pattern information may be transmitted on a frequency which is related to the initial PO.

In step S806, the UE may monitor calculated PF/PO on the received initial BWP ID. The calculated PF or calculated PO may be the initial PO or initial PF, respectively.

In step S808, if it is determined that signal during the initial PO is not detected, the UE may calculate an additional PO or PF based on the frequency pattern information. When the signal is not detected in the initial PO, it may be considered that LBT is failed. The additional PO or PF may be referred as a supplementary PO or PF. The signal expected to be transmitted in the initial PO may be paging related signal. The signal may be a discovery reference signal (DRS). The signal may be transmitted in a way that the DRS is transmitted.

In specific, the UE may determine whether a signal during the initial PO is not detected, based on a quality of a cell that the UE is camping on. After the UE derives the cell quality and the cell quality is below the minimum cell selection value (e.g. Qrxlevmin) or cannot derive the cell quality, the UE may assume that UE does not detect the signals in the initial PO.

If UE does not detect signal during the initial PO, the UE may reselect to the received additional frequency and monitor the supplementary PO on the additional frequency.

According to embodiments of the present disclosure, the network may dynamically control the UE distribution on the frequency. If UEs are crowded on a frequency, the success probability of uplink LBT would be low. The PO is calculated by UE ID. So, some PO may be crowded and some PO may be not.

Figure 9:
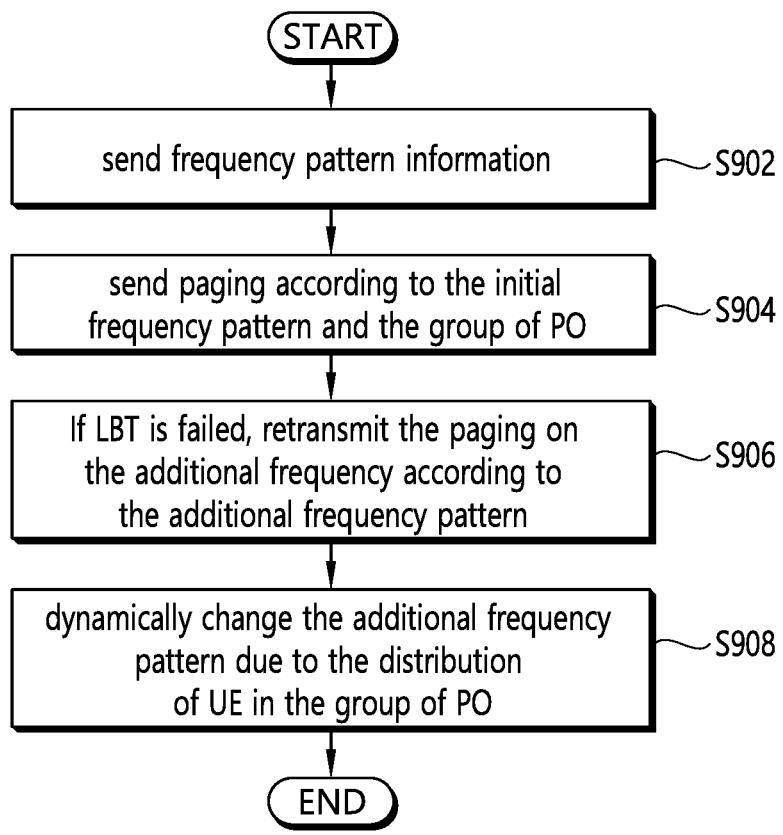
FIG. 9 shows a method for transmitting a paging in unlicensed band according to an embodiment of the present disclosure.

FIG. 9 shows a method for transmitting a paging in unlicensed band according to an embodiment of the present disclosure. In this embodiment, UE may be not only a terminal device, but also any type of device operating as wireless device, for example, an integrated access backhaul (IAB) node. Therefore, a UE may be referred as a wireless device. This embodiment may be described in perspective of a network. The network may be at least one of base station (BS), gNodeB (gNB) or eNodeB (eNB)).

In step S902, the network may transmit frequency pattern information. The frequency pattern may correspond to the group of PO or UE ID. The frequency pattern may include initial BWP ID, configuration and the frequency pattern of additional PO. Further, the frequency pattern information may include BWP ID offset, additional BWP ID, and configuration. The network may send the frequency pattern via broadcast message, or dedicated message. The broadcast message may be at least one of SIB or default PO. The dedicated message may be a release message.

In step S904, the network may send paging based on the initial frequency pattern and the group of PO.

In step S906, if LBT is failed, the network may retransmit the paging on the additional frequency according to the additional frequency pattern.

In step S908, the network may dynamically change the additional frequency pattern due to the distribution of UE in the group of PO.

According to embodiments of the present disclosure, the network may dynamically control the UE distribution and it can increase the success probability of uplink LBT. Also, the UE may not need to wait until the next DRX cycle. From the present disclosure, the UE monitors additional PO on the additional frequency. So, it can reduce the paging delay.

Figure 10:
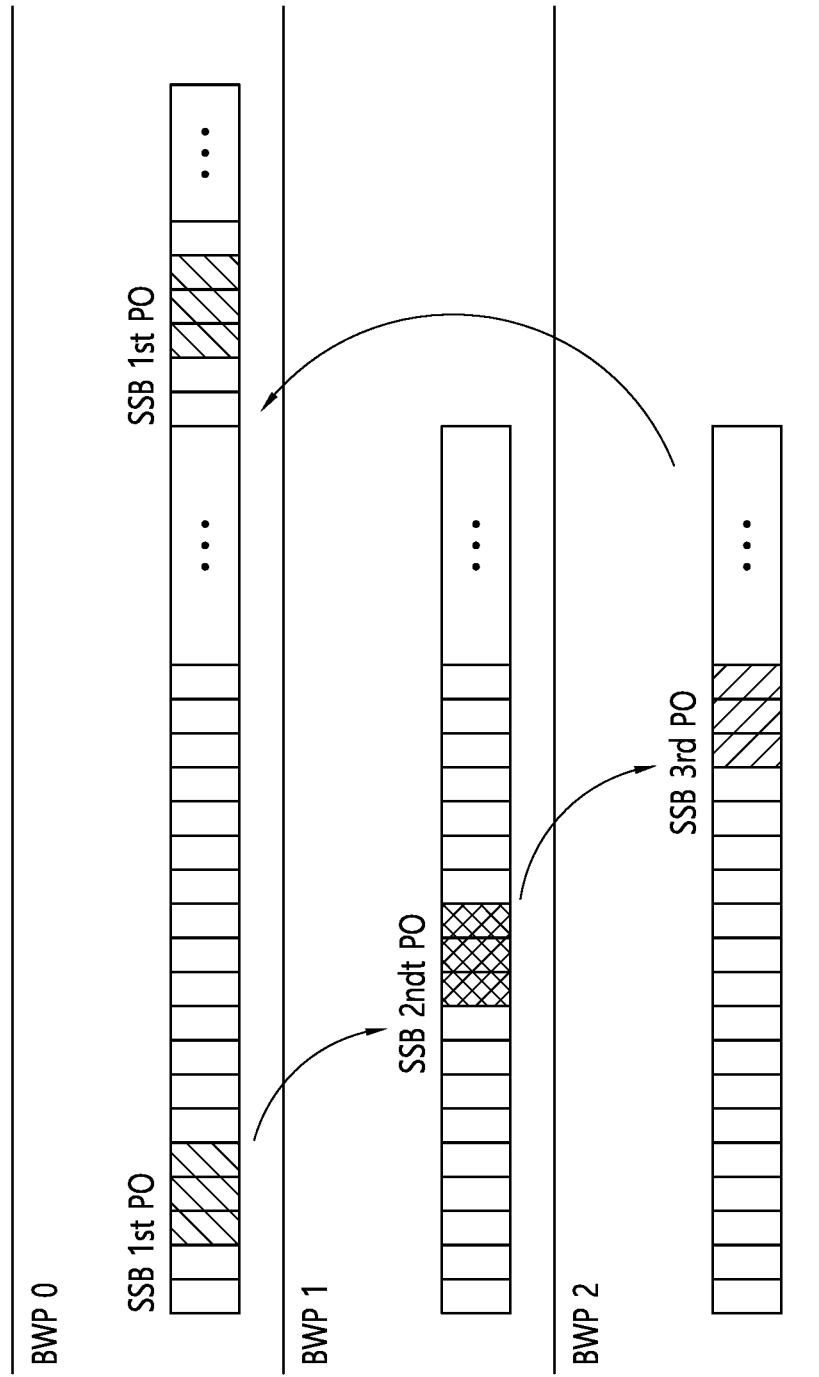
FIG. 10 shows an example of monitoring paging according to an embodiment of the present disclosure.

FIG. 10 shows an example of monitoring paging according to an embodiment of the present disclosure.

In unlicensed band, the UE may need to spend more time for responding paging. The gNB may perform LBT before transmitting paging. So, if the LBT is failed, UE may wait to receive the paging until next paging cycle. It may cause paging delay. Moreover, if UEs are crowded on a frequency, the success probability of uplink LBT would be low. The PO may be calculated by UE ID. So, some PO may be crowded and some PO may be not. In legacy, network cannot control the distribution of UEs in determined PO. The embodiment of the present disclosure may propose the network dynamically control the UE distribution on a frequency by providing frequency patterns of additional PO. For example, the UE may receive frequency pattern information (e.g. BWP ID and configuration) from network.

As shown in FIG. 10, the frequency pattern information may include the initial frequency of each PO groups. That is, BWP ID 0 and BWP0 configuration for UEs may be a 1st PO group, BWP ID 1 and BWP1 configuration for UEs may be a 2nd PO group, and BWP ID 2 and BWP2 configuration for UEs may be a 3rd PO group. The frequency pattern information may also include frequency information of additional PO. That is, BWP ID offset 1 for each PO group or BWP ID 1 for UEs may be a 1st PO group, BWP ID 2 for UEs may be a 2nd PO group, and BWP ID 0 for UEs may be a 3rd PO group.

The POs may be located following a reference signals, such as a synchronization signal physical (SS)/broadcast channel (PBCH) block (SSB).

The UE may receive the frequency pattern via broadcast message (e.g. SIB, default PO), or dedicated message (e.g. Release message). The UE may monitor calculated PF/PO on the received initial BWP ID. If UE does not detect DRS-like signal during the first PO, the UE may reselect to the received additional frequency and monitor the supplementary PO on the additional frequency. Then, the UE may not need to wait until the next DRX cycle and the paging delay is reduced. In addition, network may dynamically control the UE distribution on the frequency and it can increase the success probability of uplink LBT.

According to embodiments of the present disclosure, the network may dynamically control the UE distribution on the frequency. If UEs are crowded on a frequency, the success probability of uplink LBT would be low. The PO is calculated by UE ID. So, some PO may be crowded and some PO may be not. Further, the network may dynamically control the UE distribution and it can increase the success probability of uplink LBT. Also, the UE may not need to wait until the next DRX cycle. From the present disclosure, the UE monitors additional PO on the additional frequency. So, it can reduce the paging delay.

Figure 11:
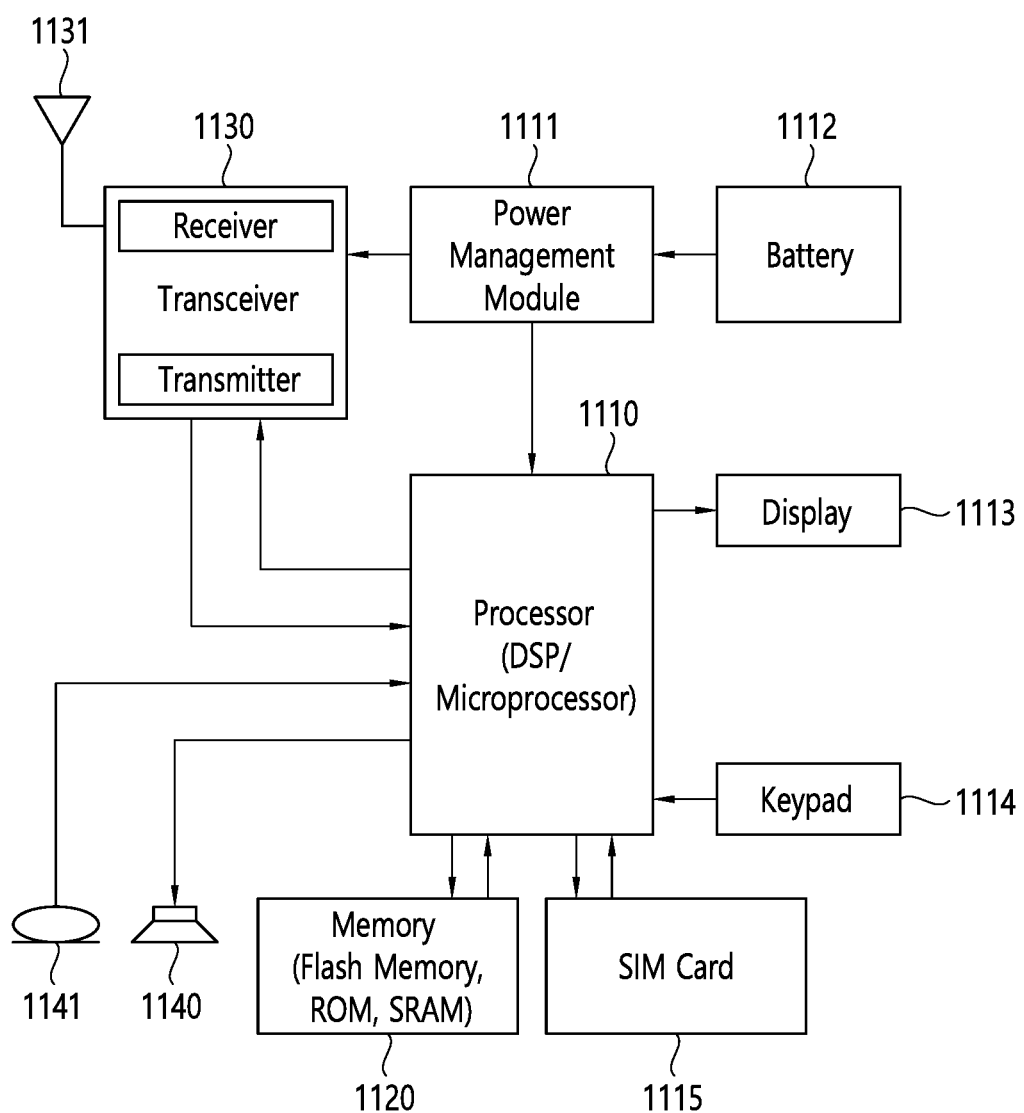
FIG. 11 shows more detailed wireless device to implement an embodiment of the present disclosure.

FIG. 11 shows more detailed wireless device to implement an embodiment of the present disclosure. The present disclosure described above for wireless device side may be applied to this embodiment.

A wireless device includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include ASIC, other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 1110 may be configured to calculate a first paging occasion (PO) based on identifier (ID) of the wireless device which belongs to a first group.

The processor 1110 may be configured to monitor the first PO based on a first frequency.

The processor 1110 may be configured to receive frequency pattern information on the first frequency. The frequency pattern information may include information on the second group of wireless devices. The frequency pattern information may be transmitted via a dedicated message or a broadcast message When a signal is not detected in the first PO, the processor 1110 may be configured to monitor a second PO on a second frequency based on the frequency pattern information. The second PO may be related to a second group. The first PO and the second PO may be located in different time duration. A gap between the first PO and the second PO may be smaller than a periodicity of the first PO. The first frequency and the second frequency may be on an unlicensed band. It may be determined that the signal is not detected in the first PO, when a channel quality related to the first PO is below a threshold.

The processor 1110 may be configured to communicate with at least one of a mobile terminal, a network or autonomous vehicles other than the wireless device.

According to embodiments of the present disclosure, the network may dynamically control the UE distribution on the frequency. If UEs are crowded on a frequency, the success probability of uplink LBT would be low. The PO is calculated by UE ID. So, some PO may be crowded and some PO may be not. Further, the network may dynamically control the UE distribution and it can increase the success probability of uplink LBT. Also, the UE may not need to wait until the next DRX cycle. From the present disclosure, the UE monitors additional PO on the additional frequency. So, it can reduce the paging delay.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 12:
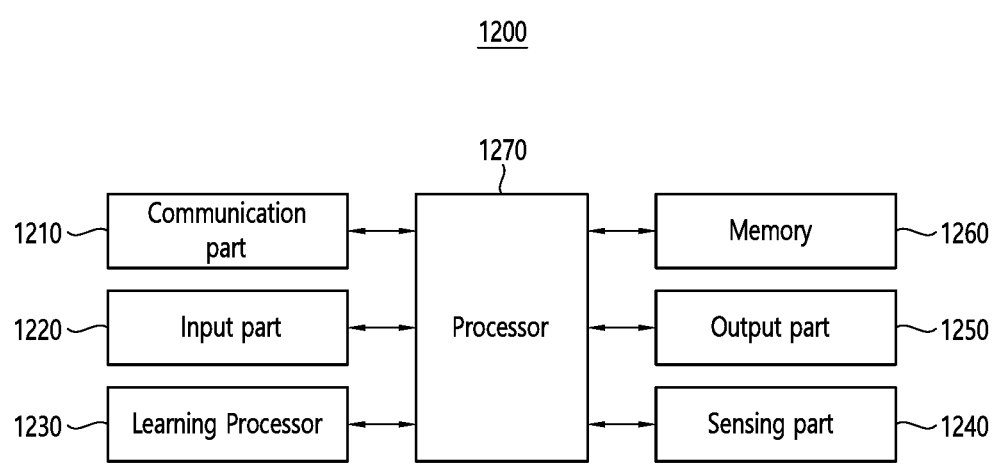
FIG. 12 shows an example of an AI device to which the technical features of the present disclosure can be applied.

FIG. 12 shows an example of an AI device to which the technical features of the disclosure can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display unit for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
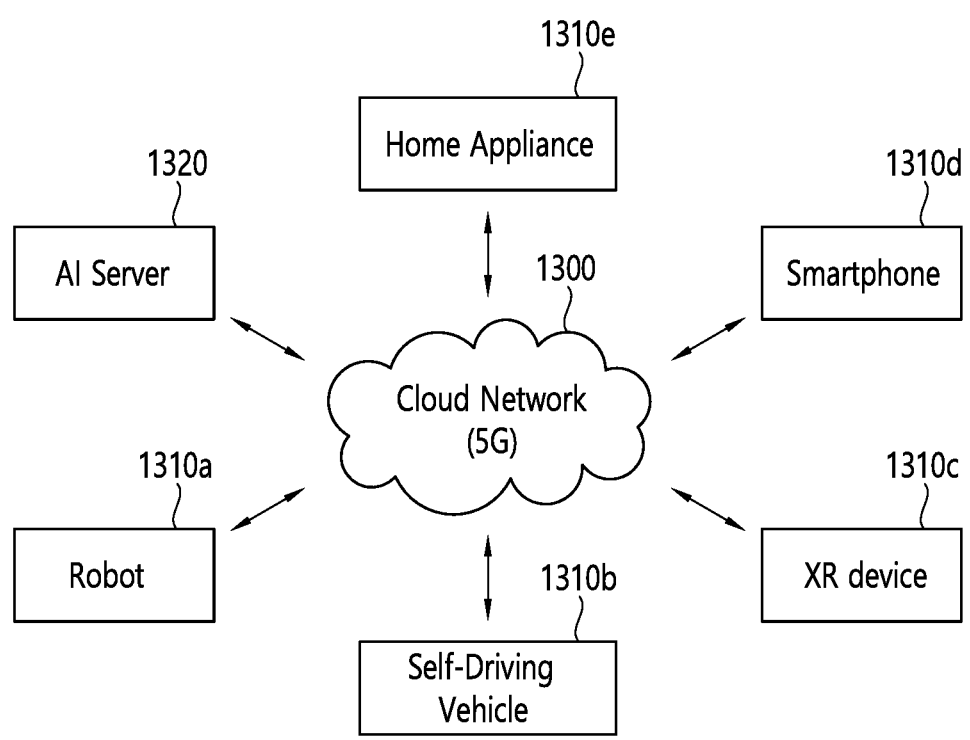
FIG. 13 shows an example of an AI system to which the technical features of the present disclosure can be applied.

FIG. 13 shows an example of an AI system to which the technical features of the present disclosure can be applied.

Referring to FIG. 13, in the AI system, at least one of an AI server 1320, a robot 1310*a*, an autonomous vehicle 1310*b*, an XR device 1310*c*, a smartphone 1310*d* and/or a home appliance 1310*e* is connected to a cloud network 1300. The robot 1310*a*, the autonomous vehicle 1310*b*, the XR device 1310*c*, the smartphone 1310*d*, and/or the home appliance 1310*e* to which the AI technology is applied may be referred to as AI devices 1310*a* to 1310*e*.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310*a* to 1310*e* and 1320 consisting the AI system may be connected to each other through the cloud network 1300. In particular, each of the devices 1310*a* to 1310*e* and 1320 may communicate with each other through a base station, but may directly communicate with each other without using a base station.

The AI server 1320 may include a server for performing AI processing and a server for performing operations on big data. The AI server 1320 is connected to at least one or more of AI devices constituting the AI system, i.e. the robot 1310*a*, the autonomous vehicle 1310*b*, the XR device 1310*c*, the smartphone 1310*d* and/or the home appliance 1310*e* through the cloud network 1300, and may assist at least some AI processing of the connected AI devices 1310*a* to 1310*e*. The AI server 1320 can learn the ANN according to the machine learning algorithm on behalf of the AI devices 1310*a* to 1310*e*, and can directly store the learning models and/or transmit them to the AI devices 1310*a* to 1310*e*. The AI server 1320 may receive the input data from the AI devices 1310*a* to 1310*e*, infer the result value with respect to the received input data using the learning model, generate a response and/or a control command based on the inferred result value, and transmit the generated data to the AI devices 1310*a* to 1310*e*. Alternatively, the AI devices 1310*a* to 1310*e* may directly infer a result value for the input data using a learning model, and generate a response and/or a control command based on the inferred result value.

Various embodiments of the AI devices 1310*a* to 1310*e* to which the technical features of the present disclosure can be applied will be described. The AI devices 1310*a* to 1310*e* shown in FIG. 13 can be seen as specific embodiments of the AI device 1200 shown in FIG. 12.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a wireless device in a wireless communication system, the method comprising:
    calculating a first paging occasion (PO) based on an identifier (ID) of the wireless device which belongs to a first group;
    monitoring the first PO based on a first frequency;
    receiving frequency pattern information on the first frequency,
    wherein the frequency pattern information includes at least one of a bandwidth part (BWP) ID and configuration information,
    when a discovery reference signal is not detected in the first PO, monitoring a second PO on a second frequency based on the frequency pattern information,
    wherein the second PO is related to a second group,
    wherein the first PO and the second PO are located in different time durations,
    wherein a gap between the first PO and the second PO is smaller than a periodicity of the first PO, and
    wherein it is determined that the signal is not detected in the first PO, based on a channel quality related to the first PO being below a threshold.

2. The method of claim 1, wherein the first frequency and the second frequency are on an unlicensed band.

3. The method of claim 1, wherein the frequency pattern information includes information on the second group of wireless devices.

4. The method of claim 1, wherein the frequency pattern information is transmitted via a dedicated message or a broadcast message.

5. The method of claim 1, wherein the wireless device communicates with at least one of a mobile terminal, a network or autonomous vehicles other than the wireless device.

6. A wireless device in a wireless communication system, the wireless device comprising:
    a memory;
    a transceiver; and
    a processor, operably coupled to the memory and the transceiver, and configured to:

calculate a first paging occasion (PO) based on an identifier (ID) of the wireless device which belongs to a first group;
monitor the first PO based on a first frequency;
control the transceiver to receive frequency pattern information on the first frequency,
wherein the frequency pattern information includes at least one of a bandwidth part (BWP) ID and configuration information,
when a discovery reference signal is not detected in the first PO, monitor a second PO on a second frequency based on the frequency pattern information,
wherein the second PO is related to the second group,
wherein the first PO and the second PO are located in different time durations,
wherein a gap between the first PO and the second PO is smaller than a periodicity of the first PO, and
wherein it is determined that the signal is not detected in the first PO, based on a channel quality related to the first PO being below a threshold.

7. The wireless device of claim 6, wherein the first frequency and the second frequency are on an unlicensed band.

8. The wireless device of claim 6, wherein the frequency pattern information includes information on the second group of wireless devices.

9. The wireless device of claim 6, wherein the frequency pattern information is transmitted via a dedicated message or a broadcast message.

* * * * *